United States Patent
Huber et al.

(10) Patent No.: US 11,573,325 B2
(45) Date of Patent: Feb. 7, 2023

(54) SYSTEMS AND METHODS FOR IMPROVEMENTS IN SCANNING AND MAPPING

(71) Applicant: Kaarta, Inc., Pittsburgh, PA (US)

(72) Inventors: Steven Huber, Pittsburgh, PA (US); Calvin Wade Sheen, Chula Vista, CA (US); Ji Zhang, Pittsburgh, PA (US)

(73) Assignee: Kaarta, Inc., Pittsburgh, PA (US)

( * ) Notice: Subject to any disclaimer, the term of this patent is extended or adjusted under 35 U.S.C. 154(b) by 315 days.

(21) Appl. No.: 16/733,787

(22) Filed: Jan. 3, 2020

(65) Prior Publication Data
US 2020/0142074 A1    May 7, 2020

Related U.S. Application Data

(63) Continuation of application No. PCT/US2018/040269, filed on Jun. 29, 2018, which
(Continued)

(51) Int. Cl.
*G01S 17/89* (2020.01)
*G01B 11/24* (2006.01)
(Continued)

(52) U.S. Cl.
CPC .............. *G01S 17/89* (2013.01); *G01B 11/24* (2013.01); *G01S 7/4817* (2013.01); *G02B 26/101* (2013.01)

(58) Field of Classification Search
CPC ...... B25J 9/1697; G06K 9/6206; G06T 17/20; G06T 5/20; G06T 3/4053; G06Q 30/0206;
(Continued)

(56) References Cited

U.S. PATENT DOCUMENTS 5,988,862 A  11/1999 Kacyra et al.
6,009,188 A  12/1999 Cohen et al.
(Continued)

FOREIGN PATENT DOCUMENTS

CN  102508258 A  6/2012
CN  102607526 A  7/2012
(Continued)

OTHER PUBLICATIONS

"Measurement accuracy of Lidarbased SLAM systems", Sep. 2016, 1-15.
(Continued)

*Primary Examiner* — Phuoc H Doan
(74) *Attorney, Agent, or Firm* — GTC Law Group PC & Affiliates

(57) ABSTRACT

A method of pose calculation for a portable three-dimensional scanning device including a first sensor and a second sensor the method including utilizing data from the first sensor and data from the second sensor to acquire data defining six degrees of freedom of the scanning device to optimize a first pose calculation, receiving data comprising one of data from the first sensor and data from the second sensor, selecting a subset of the six degrees of freedom of the scanning device, utilizing the data from the first sensor and the received data for the selected subset of six degrees of freedom to optimize a second pose, wherein the unselected degrees of freedom are retained from the first pose and storing received data associated with the second camera pose in a point cloud database.

11 Claims, 6 Drawing Sheets

Related U.S. Application Data is a continuation-in-part of application No. PCT/US2018/015403, filed on Jan. 26, 2018, which is a continuation-in-part of application No. PCT/US2017/055938, filed on Oct. 10, 2017, which is a continuation of application No. PCT/US2017/055938, filed on Oct. 10, 2017, which is a continuation-in-part of application No. PCT/US2017/021120, filed on Mar. 7, 2017, which is a continuation-in-part of application No. PCT/US2017/021120, filed on Mar. 7, 2017.

(60) Provisional application No. 62/527,341, filed on Jun. 30, 2017, provisional application No. 62/451,294, filed on Jan. 27, 2017, provisional application No. 62/406,910, filed on Oct. 11, 2016, provisional application No. 62/307,061, filed on Mar. 11, 2016.

(51) Int. Cl.
   *G02B 26/10* (2006.01)
   *G01S 7/481* (2006.01)

(58) Field of Classification Search
   CPC ....... A61B 3/09; A61B 3/0325; A61B 5/6814; A61B 5/4857; H04L 9/0894; H04L 9/0872; H04L 9/14
   USPC ............................................. 382/154; 702/151
   See application file for complete search history.

(56) References Cited

U.S. PATENT DOCUMENTS

| | | | |
|---|---|---|---|
| 6,111,582 A | 8/2000 | Jenkins | |
| D432,930 S | 10/2000 | Sanoner | |
| 6,208,347 B1 | 3/2001 | Migdal et al. | |
| 6,771,840 B1 | 8/2004 | Ioannou et al. | |
| 7,567,731 B2 | 7/2009 | Mcdowall et al. | |
| 7,752,483 B1 | 7/2010 | Muresan et al. | |
| 8,180,107 B2 | 5/2012 | Broaddus et al. | |
| 8,406,994 B1 | 3/2013 | Pu et al. | |
| 8,676,498 B2 | 3/2014 | Ma et al. | |
| 8,996,228 B1 | 3/2015 | Ferguson et al. | |
| 9,031,809 B1 | 5/2015 | Kumar et al. | |
| 9,043,069 B1 | 5/2015 | Burnette et al. | |
| 9,143,413 B1 | 9/2015 | Manku et al. | |
| 9,315,192 B1 | 4/2016 | Zhu et al. | |
| D823,920 S | 7/2018 | Wiegmann | |
| 10,296,828 B2 | 5/2019 | Viswanathan | |
| 10,442,431 B2 | 10/2019 | Chutorash | |
| 10,551,850 B2 | 2/2020 | Panzica et al. | |
| 10,962,370 B2 | 3/2021 | Zhang et al. | |
| 10,989,542 B2 | 4/2021 | Zhang et al. | |
| 11,009,884 B2 | 5/2021 | Huval et al. | |
| 11,194,938 B2 | 12/2021 | Kincart et al. | |
| 11,237,563 B2 | 2/2022 | Javault et al. | |
| 11,398,075 B2 | 7/2022 | Zhang et al. | |
| 2003/0001835 A1 | 1/2003 | Dimsdale et al. | |
| 2003/0160785 A1 | 8/2003 | Baumberg | |
| 2005/0168437 A1 | 8/2005 | Carl et al. | |
| 2005/0203930 A1 | 9/2005 | Bukowski et al. | |
| 2005/0286757 A1 | 12/2005 | Zitnick et al. | |
| 2006/0188143 A1* | 8/2006 | Strassenburg-Kleciak | G06T 7/30 382/154 |
| 2007/0097120 A1 | 5/2007 | Wheeler et al. | |
| 2007/0262988 A1 | 11/2007 | Christensen et al. | |
| 2007/0291233 A1 | 12/2007 | Culbertson et al. | |
| 2008/0033645 A1 | 2/2008 | Levinson et al. | |
| 2008/0112610 A1 | 5/2008 | Israelsen et al. | |
| 2008/0243426 A1* | 10/2008 | Lundgren | G01S 13/422 702/151 |
| 2009/0043439 A1 | 2/2009 | Barfoot et al. | |
| 2009/0237297 A1 | 9/2009 | Davis et al. | |
| 2009/0262974 A1 | 10/2009 | Lithopoulos et al. | |
| 2010/0090899 A1 | 4/2010 | Zhao et al. | |
| 2010/0111370 A1 | 5/2010 | Black et al. | |
| 2010/0286905 A1 | 11/2010 | Goncalves et al. | |
| 2011/0134225 A1 | 6/2011 | Saint-Pierre et al. | |
| 2011/0178708 A1 | 7/2011 | Zhang et al. | |
| 2011/0282622 A1 | 11/2011 | Canter | |
| 2011/0300929 A1 | 12/2011 | Tardif et al. | |
| 2011/0301786 A1 | 12/2011 | Allis et al. | |
| 2012/0123615 A1 | 5/2012 | Bourzier | |
| 2013/0085378 A1 | 4/2013 | Wedan et al. | |
| 2013/0135305 A1 | 5/2013 | Bystrov et al. | |
| 2013/0176305 A1 | 7/2013 | Ito et al. | |
| 2013/0181983 A1 | 7/2013 | Kitamura et al. | |
| 2013/0321418 A1 | 12/2013 | Kirk | |
| 2013/0325244 A1 | 12/2013 | Wang et al. | |
| 2014/0043436 A1 | 2/2014 | Bell et al. | |
| 2014/0125768 A1 | 5/2014 | Bell et al. | |
| 2014/0180579 A1 | 6/2014 | Friend et al. | |
| 2014/0180914 A1 | 6/2014 | Abhyanker | |
| 2014/0193040 A1 | 7/2014 | Bronshtein | |
| 2014/0214255 A1 | 7/2014 | Dolgov et al. | |
| 2014/0278570 A1 | 9/2014 | Plummer et al. | |
| 2014/0297092 A1 | 10/2014 | Delp | |
| 2014/0300885 A1 | 10/2014 | Debrunner et al. | |
| 2014/0300886 A1 | 10/2014 | Zogg et al. | |
| 2014/0301633 A1 | 10/2014 | Furukawa et al. | |
| 2014/0316698 A1 | 10/2014 | Roumeliotis et al. | |
| 2014/0333741 A1 | 11/2014 | Nerurkar et al. | |
| 2014/0350836 A1 | 11/2014 | Stettner et al. | |
| 2014/0379256 A1 | 12/2014 | Stipes et al. | |
| 2015/0015602 A1 | 1/2015 | Beaudoin | |
| 2015/0063683 A1 | 3/2015 | Fu | |
| 2015/0063707 A1 | 3/2015 | Fu | |
| 2015/0142378 A1 | 5/2015 | Hebert et al. | |
| 2015/0243080 A1 | 8/2015 | Steinbach et al. | |
| 2015/0317832 A1 | 11/2015 | Ebstyne et al. | |
| 2015/0331111 A1 | 11/2015 | Newman et al. | |
| 2015/0350378 A1 | 12/2015 | Hertel et al. | |
| 2016/0070265 A1 | 3/2016 | Liu et al. | |
| 2016/0086336 A1 | 3/2016 | Lin et al. | |
| 2016/0125226 A1 | 5/2016 | Huang | |
| 2016/0140757 A1 | 5/2016 | Voth | |
| 2016/0189348 A1 | 6/2016 | Canter | |
| 2016/0234476 A1 | 8/2016 | Millett | |
| 2016/0260250 A1 | 9/2016 | Jovanovic et al. | |
| 2016/0266256 A1 | 9/2016 | Allen et al. | |
| 2016/0274589 A1 | 9/2016 | Templeton et al. | |
| 2016/0349746 A1 | 12/2016 | Grau | |
| 2016/0379366 A1 | 12/2016 | Shah et al. | |
| 2017/0116781 A1 | 4/2017 | Babahajiani et al. | |
| 2017/0122736 A1 | 5/2017 | Dold et al. | |
| 2017/0123066 A1 | 5/2017 | Coddington et al. | |
| 2017/0186221 A1 | 6/2017 | Khorasani | |
| 2017/0191826 A1 | 7/2017 | Nagori et al. | |
| 2017/0208251 A1 | 7/2017 | Shamir et al. | |
| 2017/0212529 A1 | 7/2017 | Kumar et al. | |
| 2018/0075648 A1 | 3/2018 | Moghadam et al. | |
| 2018/0342080 A1 | 11/2018 | Maddern et al. | |
| 2019/0003836 A1 | 1/2019 | Zhang et al. | |
| 2019/0052844 A1 | 2/2019 | Droz et al. | |
| 2019/0235083 A1 | 8/2019 | Zhang et al. | |
| 2019/0346271 A1 | 11/2019 | Zhang et al. | |
| 2020/0217666 A1 | 7/2020 | Zhang et al. | |
| 2020/0233085 A1 | 7/2020 | Zhang et al. | |
| 2020/0349761 A1 | 11/2020 | Zhang et al. | |
| 2020/0400442 A1 | 12/2020 | Huber et al. | |
| 2021/0025998 A1 | 1/2021 | Huber | |
| 2021/0027477 A1 | 1/2021 | Huber | |
| 2021/0293544 A1 | 9/2021 | Zhang et al. | |
| 2021/0293546 A1 | 9/2021 | Zhang et al. | |

FOREIGN PATENT DOCUMENTS

| | | |
|---|---|---|
| CN | 102819863 A | 12/2012 |
| CN | 104913763 A | 9/2015 |
| CN | 105164494 A | 12/2015 |
| CN | 109313024 A | 2/2019 |
| DE | 102014019671 A1 | 6/2016 |
| EP | 2133662 B1 | 2/2012 |

(56) References Cited

FOREIGN PATENT DOCUMENTS

| | | |
|---|---|---|
| EP | 3109589 A1 | 12/2016 |
| EP | 3427008 A1 | 1/2019 |
| EP | 2913796 B1 | 3/2019 |
| EP | 3526626 A1 | 8/2019 |
| EP | 3574285 A1 | 12/2019 |
| EP | 3646058 A1 | 5/2020 |
| EP | 3656138 A1 | 5/2020 |
| HK | 1261850 | 1/2020 |
| JP | H09142236 A | 6/1997 |
| JP | 2004348575 A | 12/2004 |
| JP | 2006276012 A | 10/2006 |
| JP | 2007298332 A | 11/2007 |
| JP | 2010175423 A | 8/2010 |
| JP | 2010533307 A | 10/2010 |
| JP | 2011529569 A | 12/2011 |
| JP | 3173419 U | 1/2012 |
| JP | 2012063173 A | 3/2012 |
| JP | 2012507011 A | 3/2012 |
| JP | 2013054660 A | 3/2013 |
| JP | 2013093738 A | 5/2013 |
| JP | 2013517483 A | 5/2013 |
| JP | 2015200615 A | 11/2015 |
| JP | 2015210186 A | 11/2015 |
| JP | 2016080572 A | 5/2016 |
| JP | 2019518222 A | 6/2019 |
| JP | 2019532433 A | 11/2019 |
| JP | 2020507072 A | 3/2020 |
| JP | 6987797 B2 | 12/2021 |
| WO | 2010004911 A1 | 1/2010 |
| WO | 2014048475 A1 | 4/2014 |
| WO | 2014120613 A1 | 8/2014 |
| WO | 2014130854 A1 | 8/2014 |
| WO | 2015105597 A2 | 7/2015 |
| WO | 2017009923 A1 | 1/2017 |
| WO | 2017155970 A1 | 9/2017 |
| WO | 2018071416 A1 | 4/2018 |
| WO | 2018140701 A1 | 8/2018 |
| WO | 2019006289 A1 | 1/2019 |
| WO | 2019018315 A1 | 1/2019 |
| WO | 2019099605 A1 | 5/2019 |
| WO | 2019165194 A1 | 8/2019 |
| WO | 2019178429 A1 | 9/2019 |
| WO | 2019195270 A1 | 10/2019 |
| WO | 2020009826 A1 | 1/2020 |

OTHER PUBLICATIONS

"Safety Efficiency Performance for Near Earth Flight", www.nearearth.aero, 2015, pp. 1-2.

17763885 5, "European Application Serial No. 17763885.5, Extended European Search Report dated Sep. 17, 2019", Kaarta, Inc., 7 pages.

Zheng, et al., "Non-local Scan Consolidation for 3D Urban Scenes", ACM SIGGRAPH 2010. Retrieved on Jan. 20, 2018., 2010, 9 Pages.

Belfiore, "This Mobile Device Can Map Your Future Home", https://www.bloomberg.com/news/articles/2017-03-09/this-mobile-device-can-map-your-future-home, Mar. 9, 2017, 1-10.

Besl, et al., "A Method for RegisliaLion of 3-D Shapes", IEEE Transactions on Pattern Analysis and Machine Intelligence, vol. 14, No. 2, Feb. 1992, pp. 239-256.

Chen, et al., "Object modelling by registration of multiple range images", Image and Vision Computing, vol. 10, iss. 3, Apr. 1992, pp. 145-155.

Lopez, "Combining Object Recognition and Metric Mapping for Spatial Modeling with Mobile Robots", Master's Thesis in Computer Science at the School of Computer Science and Engineering, 2007, pp. 21-23, 44-56.

PCT/US18/40269, "International Application Serial No. PCT/US18/40269, International Preliminary Report on Patentability dated Jan. 9, 2020", Kaarta, Inc., 12 pages.

PCT/US18/40269, "International Application Serial No. PCT/US18/40269, International Search Report and Written Opinion dated Oct. 19, 2018", Kaarta, Inc., 19 Pages.

PCT/US18/40269, "International Application Serial No. PCT/US18/40269, Invitation to Pay Additional Fees and, Where Applicable, Protest Fee dated Aug. 9, 2018", Kaarta, Inc., 2 Pages.

PCT/US18/42346, "International Application Serial No. PCT/US18/42346, International Search Report and Written Opinion dated Oct. 1, 2018", Kaarta, Inc., 13 Pages.

PCT/US18/61186, "International Application Serial No. PCT/US18/61186, International Search Report and Written Opinion dated Mar. 18, 2019", Kaarta, Inc., 11 pages.

PCT/US18/61186, "International Application Serial No. PCT/US18/61186, Invitation to Pay Additional Fees and, Where Applicable, Protest Fee dated Jan. 16, 2019", Kaarta, Inc., 2 pages.

PCT/US19/22384, "International Application Serial No. PCT/US19/22384, International Search Report and Written Opinion dated Aug. 7, 2019", Kaarta, Inc., 14 pages.

PCT/US2017/021120, "Application Serial No. PCT/US2017/021120, International Search Report and the Written Opinion dated May 31, 2017", 8 pages.

PCT/US2017/021120, "International Application Serial No. PCT/US2017/021120, International Preliminary Report on Patentability and Written Opinion dated Sep. 20, 2018", Kaarta, Inc., 7 Pages.

PCT/US2017/055938, "Application Serial No. PCTUS2017055938, Invitation to Pay Additional Fees dated Nov. 14, 2017", 2 Pages.

PCT/US2017/055938, "International Application Serial No. PCT/US2017/055938, International Preliminary Report on Patentability dated Apr. 25, 2019", Kaarta, Inc., 14.

PCT/US2017/055938, "International Application Serial No. PCT/US2017/055938, International Search Report and Written Opinion dated Feb. 7, 2018", Kaarta, Inc., 17 pages.

PCT/US2018/015403, "International Application Serial No. PCT/US2018/015403, International Preliminary Report on Patentability dated Aug. 8, 2019", Kaarta, Inc., 5 pages.

PCT/US2018/015403, "International Application Serial No. PCT/US2018/015403, International Search Report and Written Opinion dated Mar. 22, 2018", Kaarta, Inc., 12 Pages.

PCT/US2019/019132, "International Application Serial No. PCT/US2019/019132, International Search Report and Written Opinion dated May 14, 2019", Kaarta, Inc., 15 pages.

PCT/US2019/022384, "International Application Serial No. PCT/US2019/022384,Invitation to Pay Additional Fees dated May 20, 2019", Kaarta, Inc., 2 pages.

PCT/US2019/025360, "International Application Serial No. PCT/US2019/025360, International Search Report and Written Opinion dated Jun. 21, 2019", Kaarta, Inc., 7 pages.

PCT/US2019/038688, "International Application Serial No. PCT/US2019/038688, International Search Report and Written Opinion dated Sep. 12, 2019", Kaarta, Inc., 12 pages.

Zhang, et al., "Laser-visual-inertial odometry and mapping with high robustness and low drift", wileyonlinelibrary.com/journal/rob, Nov. 10, 2017, pp. 1242-1264.

Zhang, et al., "Laser-visual-inertial Odometry Enabling Aggressive Motion Estimation and Mapping at High Robustness and Low Drift", sagepub.co.uk/journalsPermissions.nav DOI: 10.1177/ToBeAssigned www.sagepub.com/, Nov. 2017, pp. 1-18.

Zhang, et al., "LOAM: Lidar Odometry and Mapping in Real-time", Robotics: Science and Systems Conference, Jul. 2014, 9 pages.

Zhang, "Online Lidar and Vision based Ego-motion Estimation and Mapping", Feb. 2017, 1-130.

Zhang, "Online Mapping with a Real Earth Contour II", https://www.youtube.com/watch?v=CfsM4-x6feU, Nov. 24, 2015.

Zhang, et al., "Real-time Depth Enhanced Monocular Odometry", 2014 IEEE/RSJ International Conference on Intelligent Robots and Systems (IROS 2014), Chicago, IL, USA, Sep. 14-18, 2014, pp. 4973-4980.

Zhang, et al., "Visual-Lidar Odometry and Mapping: Low-drift, Robust, and Fast", 2015 IEEE International Conference on Robotics and Automation (ICRA), Washington State Convention Center, Seattle, Washington., May 26-30, 2015, pp. 2174-2181.

18834521.9, "European Application Serial No. 18834521.9, Extended European Search Report dated Apr. 12, 2021", Kaarta, Inc., 9 pages.

(56) References Cited

OTHER PUBLICATIONS

Ishii, Masahiro, "A system for acquiring three-dimensional shapes represented by gestures", "Input-Output", Image Labo., vol. 23, No. 3, Image Laboratory, Japan, Japan Industrial Publishing Co., Ltd., vol. 23, 2012, pp. 14-18.
Kim, Bong Keun, "Indoor localization and point cloud generation for bulling interior modeling", IEEE RO-MAN, 2013, pp. 186-191.
Mirowski, Piotr, et al., "Depth Camera Slam on a Low-cost WiFi Mapping Robot", Technologies for Practial Rebot Applications (TEPRA), 2012 IEEE International Conference ON, IEEE, Apr. 23, 2012, pp. 1-6.
Macher, Helene, "From Point Clouds to Building Information Models: 3D Semi-Automatic Reconstruction of Indoors of Existing Buildings", Oct. 12, 2017, 31 pages.
U.S. Appl. No. 17/188,567, filed Mar. 1, 2021, Pending.
U.S. Appl. No. 17/202,602, filed Mar. 16, 2021, Pending.
17860192.8, "European Application Serial No. 17860192.8, Extended European Search Report dated Apr. 24, 2020", Kaarta, Inc., 12 pages.
18745179.4, "European Application Serial No. 18745179.4, Extended European Search Report dated Nov. 2, 2020", Kaarta, Inc., 10 pages.
18824609.4, "European Application Serial No. 18824609.4, Extended European Search Report dated Nov. 2, 2020", Kaarta, Inc., 12 pages.
Adler, Benjamin, et al., "Towards Autonomous Airborne Mapping of Urban Environments", Multisensor Fusion and Integration for Intelligent Systems (MFI), 2012 IEEE Conference, 2012, pp. 77-82.
Chen, Chao-I, et al., "Drogue tracking using 3D flash lidar for autonomous aerial refueling", Laser Radar Technologyand Applications XVI, 2011, pp. 1-11.
PCT/US18/42346, "International Application Serial No. PCT/US18/42346, International Preliminary Report on Patentability dated Jan. 21, 2020", Kaarta, Inc., 11 pages.
PCT/US18/61186, "International Application Serial No. PCT/US18/61186, International Preliminary Report on Patentability dated May 28, 2020", Kaarta, Inc., 9 pages.
PCT/US19/22384, "International Application Serial No. PCT/US19/22384, International Preliminary Report on Patentability dated Sep. 24, 2020", Kaarta, Inc., 11 pages.
PCT/US2019/019132, "International Application Serial No. PCT/US2019/019132, International Preliminary Report on Patentability dated Sep. 3, 2020", Kaarta, Inc., 13 pages.
PCT/US2019/025360, "International Application Serial No. PCT/US2019/025360, International Preliminary Report on Patentability dated Oct. 15, 2020", Kaarta, Inc., 6 pages.
PCT/US2019/038688, "International Application Serial No. PCT/US2019/038688, International Preliminary Report on Patentability dated Jan. 14, 2021", Kaarta, Inc., 11 pages.
Wiemann, Thomas, et al., "Automatic Construction of Polygonal Maps From Point Cloud Data", Safety Security and Rescue Robotics (SSRR), 2010 IEEE International Workshop, 2010, pp. 1-6.
Chow, Jacky C.K, et al., "IMU and Multiple RGB-D Camera Fusion for Assisting Indoor Stop-and-Go 3D Terrestrial Laser Scanning", 2014, 35 pages.
Gupta, Vishisht, "Vehicle localization using low-accuracy gps, imu and Map-aided vision", 2009, 230 pages.
Wang, Miao, et al., "Incremental Segmentation of Lidar Point Clouds With an Octree-Structured Voxel Space", The Photogrammetric Record, Mar. 2011, pp. 32-57.

* cited by examiner

SYSTEMS AND METHODS FOR IMPROVEMENTS IN SCANNING AND MAPPING

STATEMENT OF PRIORITY

This application is a bypass continuation of PCT Application No. PCT/US18/40269, published as WO 2019/006289, entitled "SYSTEMS AND METHODS FOR IMPROVEMENTS IN SCANNING AND MAPPING", filed Jun. 29, 2018.

PCT Application No. PCT/US18/40269, published as WO 2019/006289, claims priority to, and is a continuation-in-part of, PCT Application No. PCT/US2018/015403, published as WO 2018/140701, entitled "LASER SCANNER WITH REAL-TIME, ONLINE EGO-MOTION ESTIMATION," filed on Jan. 26, 2018.

PCT Application No. PCT/US18/40269, published as WO 2019/006289, also claims priority to PCT Application No. PCT/US2017/055938, published as WO 2018/071416, entitled "LASER SCANNER WITH REAL-TIME, ONLINE EGO-MOTION ESTIMATION," filed on Oct. 10, 2017.

PCT Application No. PCT/US2018/015403, published as WO 2018/140701, claims priority to, and is a continuation-in-part of, PCT Application No. PCT/US2017/055938, published as WO 2018/071416, entitled "LASER SCANNER WITH REAL-TIME, ONLINE EGO-MOTION ESTIMATION," filed on Oct. 10, 2017.

PCT Application No. PCT/US2017/055938, published as WO 2018/071416, claims priority to, and is a continuation-in-part of, PCT Application No. PCT/US2017/021120, published as WO 2017/155970 entitled "LASER SCANNER WITH REAL-TIME, ONLINE EGO-MOTION ESTIMATION," filed on Mar. 7, 2017.

PCT Application No. PCT/US2018/015403, published as WO 2018/140701, claims priority to PCT Application No. PCT/US2017/021120, published as WO 2017/0155970, PCT Application No. PCT/US2017/055938, published as WO 2018/017146 further claims priority to U.S. Provisional No. 62/406,910, entitled "LASER SCANNER WITH REAL-TIME, ONLINE EGO-MOTION ESTIMATION," filed on Oct. 11, 2016.

PCT Application No. PCT/US2017/021120, published as WO 2017/155970, claims the benefit of U.S. Provisional Patent Application Ser. No. 62/307,061, entitled "LASER SCANNER WITH REAL-TIME, ONLINE EGO-MOTION ESTIMATION," filed on Mar. 11, 2016.

PCT Application No. PCT/US2018/015403, published as WO 2018/140701, further claims priority to U.S. Provisional No. 62/451,294, entitled "LIDAR AND VISION-BASED EGO-MOTION ESTIMATION AND MAPPING," filed Jan. 27, 2017.

PCT Application No. PCT/US18/40269, published as WO 2019/006289 claims the benefit of U.S. Provisional Patent Application Ser. No. 62/527,341, entitled "SYSTEMS AND METHODS FOR IMPROVEMENTS IN SCANNING AND MAPPING," filed on Jun. 30, 2017, the disclosure of which is incorporated herein by reference in its entirety and for all purposes.

The disclosures of all patents and applications referred to herein each are incorporated herein by reference in their entireties and for all purposes.

BACKGROUND

For many applications including architecture, engineering, and construction, there is a need to build accurate maps of as-built environments. Additional applications include the use of such maps by first responders, municipalities, developers, security personnel and more. The creation of such maps typically requires manual measurements, precision-surveying instruments, and imaging devices or, more recently, laser radar (lidar) to build detailed plans or a map of the environment. Lidar tools are typically stationary when providing measurements but new generations of backpack systems and wheeled carts with integral sensors, sometimes termed 'trolleys,' are also used.

New forms of mobile mapping use passive or active sensing means to quickly capture a 3D map of the environment or operate in real-time. These systems may use one or more of the following sensors: laser radar (lidar), camera, inertial measurement unit, and other sensors. Such sensors, combined with sufficient computing resources and the application of novel algorithms, may be used to build a real-time 3D map of a local environment. As the sensor moves through the environment, it gathers image, lidar, and motion data to populate a 3D map of the environment. The map accretes additional data and continues to build a map of the environment.

However, occasionally even when using this combination of sensing, computing, and processing, mapping is difficult or challenging. This is often a function of the geometry of the environment. Examples include narrow stairwells, featureless environments (either geometric or visual), or narrow transitions between two larger areas such as a doorway. In such instances the model may be distorted or warped as a result of an inability to correctly track features in the environment. This can result in the map having non-level floors or adjacent rooms that appear to be at angles to each other when in fact, they are not.

What is therefore needed is a system and a method for operating the system to scan areas that pose unique challenges for mapping solutions that use traditional simultaneously localization and mapping (SLAM) techniques.

SUMMARY

In accordance with an exemplary and non-limiting embodiment, a method of pose calculation for a portable three-dimensional scanning device comprising a first sensor and a second sensor the method comprising utilizing data from the first sensor and data from the second sensor to acquire data defining six degrees of freedom of the scanning device to optimize a first pose calculation, receiving data comprising one of data from the first sensor and data from the second sensor, selecting a subset of the six degrees of freedom of the scanning device, utilizing the data from the first sensor and the received data for the selected subset of six degrees of freedom to optimize a second pose, wherein the unselected degrees of freedom are retained from the first pose and storing received data associated with the second camera pose in a point cloud database.

In another exemplary embodiment, a method comprises utilizing inertial measurement unit (IMU) data and one of tracking camera data and laser data for six degrees of freedom of the scanning device to optimize a first pose calculation, receiving data comprising one of a scan from the laser and an image from the tracking camera, selecting a subset of the six degrees of freedom of the scanning device and utilizing the IMU data and the received data for the selected subset of six degrees of freedom to optimize a second pose, wherein the unselected degrees of freedom are retained from the first pose.

In another exemplary embodiment, method comprises computing a degraded direction in state space of a scanning device in a default mode, determining if at least one of a roll or a pitch of the scanning device is in the degraded direction, determining if a yaw of the scanning device is in the degraded direction, activating a roll and pitch lock mode if it is determined that at least one of a roll or a pitch of the scanning device is in the degraded direction and activating a yaw lock mode if it is determined that the yaw of the scanning device is in the degraded direction.

DETAILED DESCRIPTION

Figure 1:
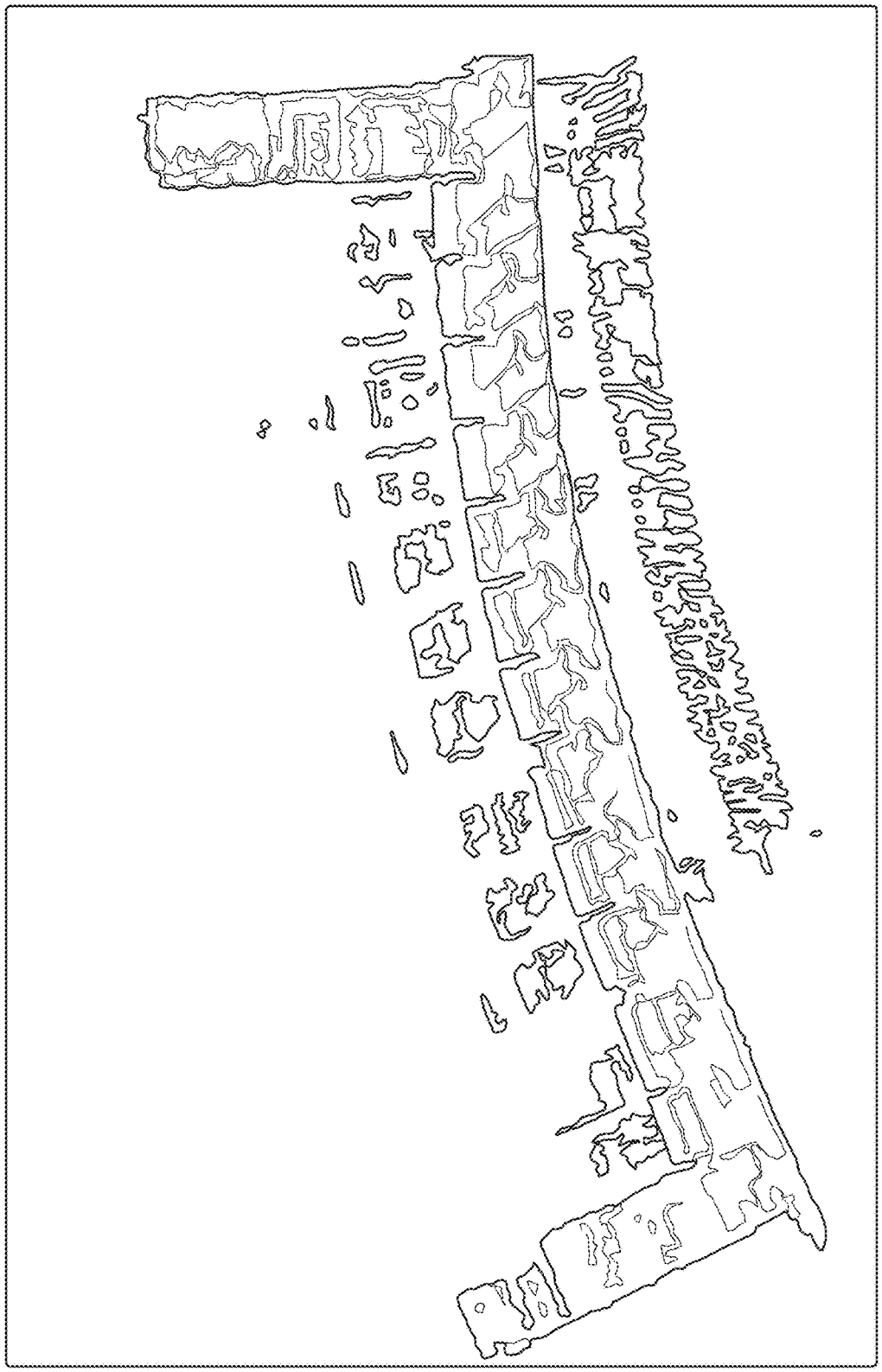
FIG. 1 illustrates an image of a map of a circular staircase created using a LIDAR scanner and an inertial measurement unit (IMU) known in the art.

With reference to FIG. 1, there is illustrated an image of a map of a circular staircase 1001 created using a lidar scanner and an inertial measurement unit (IMU). As illustrated, the map of the staircase 1001 that, in reality, extends straight upwards, displays a pronounced curvature arising from the introduction of scanning error. Even good algorithms and sensor combinations can fail in such an environment. The consistent curvature of the overall scan indicates a systemic issue. Position or orientation is not completely lost but becomes inaccurate. The result is a distortion that does not accurately reflect reality.

Figure 2:
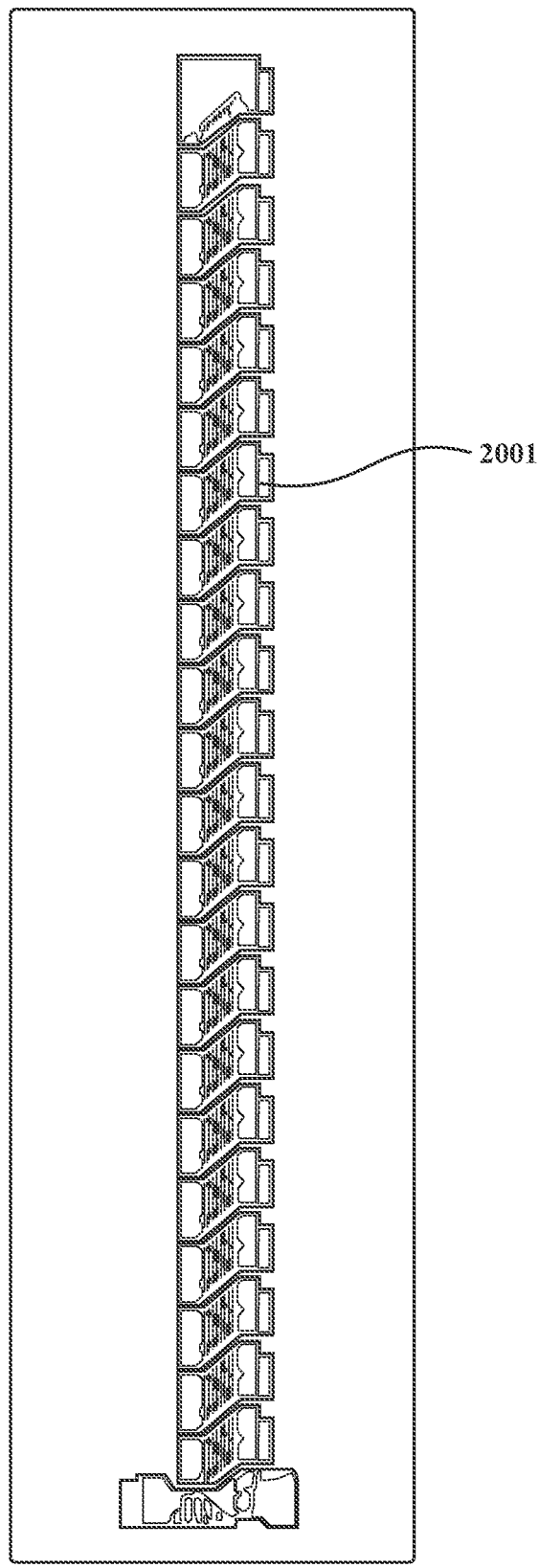
FIG. 2 is an illustration of a 3D model of a segment of a building created in accordance with exemplary and non-limiting embodiments described herein.

With reference to FIG. 2, there is illustrated an image of a 3D model of a 10-story segment of a 24-story building created in accordance with exemplary and non-limiting embodiments of the method described herein. As illustrated, staircase segment 2001 is a direct output map with no post-processing other than visual rendering. Note the lack of discernible curvature.

In accordance with exemplary and non-limiting embodiments described more fully below, a series of adjustments may be applied to the mapping process to mitigate or eliminate issues where confidence measures such as covariance matrix results, are low. The covariance matrix is a measure of how strongly correlated different parts of the pose solution are. The covariance matrix may be used to identify directions in the state estimate that are of higher and lower confidence. In an exemplary embodiment, the covariance matrix is a 6×6 matrix representing the 6 degrees of freedom: x, y, z, roll, pitch, and yaw. This matrix may be decomposed by determining the directions or vectors with the largest variance, specifically, the eignvectors). The magnitude of these eigenvectors (or eigenvalues) indicates the level of variance and the associated certainty along that direction.

For example, laser point matching in an infinite length hallway with flat walls should generate an eigenvector with low certainty oriented down the length of the hallway, indicating that the placement of the new data in that direction is uncertain. In the instance where confidence measurements are low, modes may be applied manually by recognizing the type of environment or previous patterns. Mode application may also be performed automatically by noting the degradation of the resultant map information and making parameter changes on the fly based on measurements such as the covariance matrices associated with each optimization step. The same approach may be used for hand-carried systems, vehicle-based systems, aerial, subterranean, even underwater mapping systems all of which are subject to the same issues.

Pose, such as the pose of a three-dimensional scanning device (e.g., a Simultaneous Localization And Mapping device, hereinafter a "SLAM" device) is defined by both position in space and orientation and is defined by 6 degrees of freedom using spatial coordinates and orientation (x, y, z and roll, pitch, and yaw). If a SLAM system provides good quality information about these attributes, then it likely provides good pose. If any of these drift in value or are calculated incorrectly then the pose value is in error and subsequent map information that depends on pose data will also be in error.

The mapping system continuously calculates pose while building a map and vice versa. When mapping areas in which there are narrow corridors, there are significant advantages in being able to vary pose calculation options.

Figure 3:
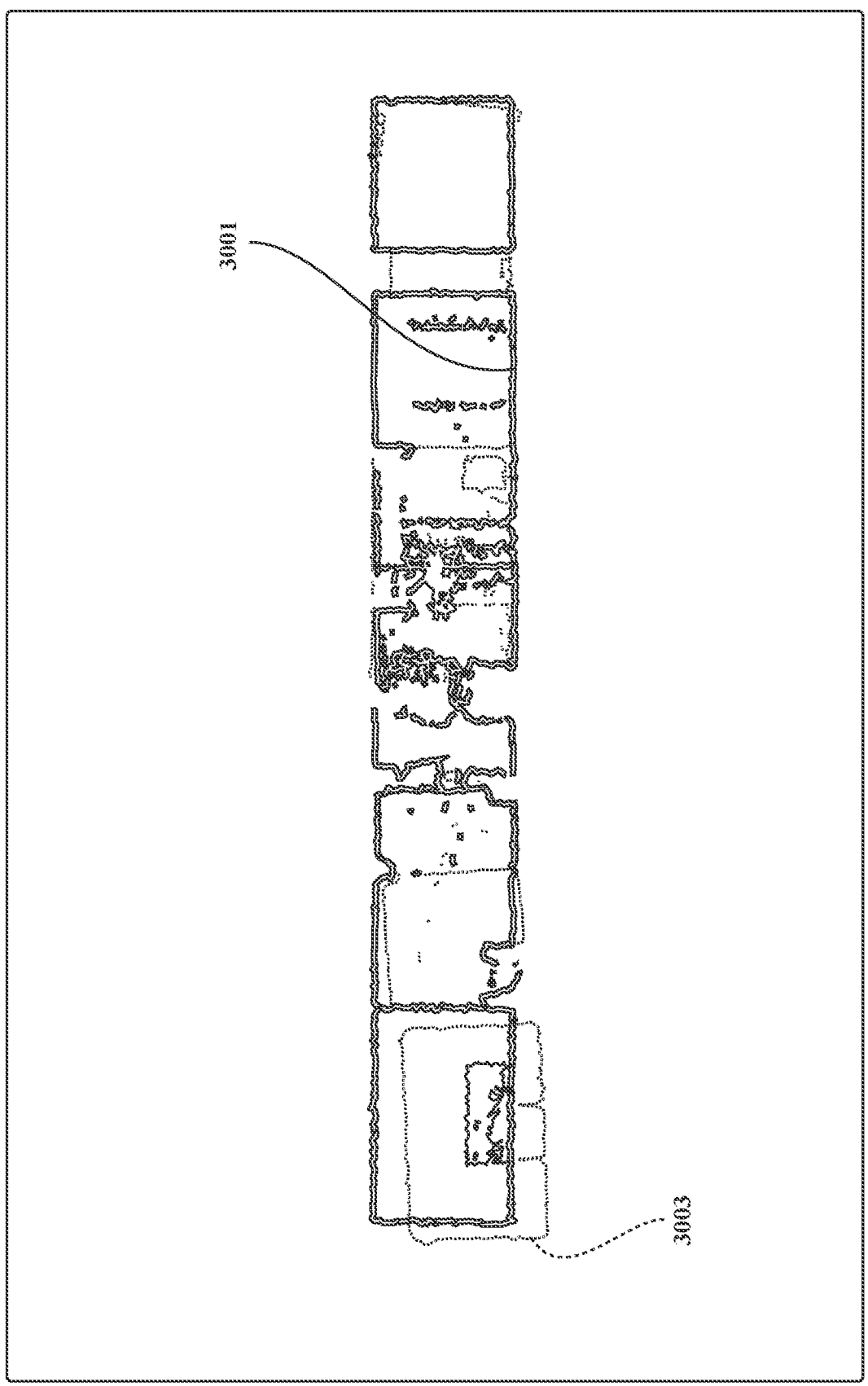
FIG. 3 is an illustration of an exemplary and non-limiting embodiment of a map created utilizing pose decoupling.

With reference to FIG. 3, there is illustrated a 3D model of a typical floor plan arrangement of rooms as in an office or other application. The solid line rendered model 3001 is formed of geometric elements that are well aligned. Superimposed over the model 3001 is dashed-line rendered model 3003. Model 3003 is visibly twisted with respect to other parts of the model. As described more fully below, dashed-line rendered model 3003 was created without pose decoupling while dashed-line rendered model 3003 was created using pose decoupling.

In particular, varying the method of computation of pose for aspects such as roll and pitch and/or the yaw may substantially improve results when going through challenging environments such as, for example, transitions comprising doorways, narrow spaces, hallways and stairwells. In such instances, varying the method of computation of pose may result in improved mapping accuracy exhibiting a low net twist of the scanned data. The method described here, achieves this improved accuracy, in part, by relying more heavily a scanning mode that utilizes sensor data that is less impacted by these environments. In such a scanning mode, the generated model, or point cloud, has significantly fewer local errors, such as rooms twisted relative to each other. One trade-off that may arise is the presence of increased blur from sensor noise and a larger global drift. However, when used for short durations in challenging parts of an environment, the overall error and resulting twist of the scanned image may be dramatically improved.

In these alternate scanning modes, image twist in terms of roll and pitch may be unstable, but the introduced error varies around a central median, rather than aggressively twisting due to a poor scan-to-scan point matching. Poor scan-to-scan point matching may result from pulling the data dramatically for successive scans that capture data from surfaces that are widely separated. As a result, such error may be improved by breaking down the motion estimate of position (e.g., pose) to be optimized for fewer degrees of freedom and then using scan matching refinement to get the "true" pose in some fashion before adding the points to the point cloud.

In certain environments certain aspects of pose can be better estimated with different methods. For example, if a combination of laser and camera data do not provide enough data to maintain constant pitch and roll, then reverting to an inertial sensor estimate that is generally noisier, but is corrected by gravity, can dramatically reduce drift. This is particularly the case traveling down a long hallway or through a transition, such as a doorway where there is little overlap with prior data for the laser data to use.

In accordance with exemplary and non-limiting embodiments, this reduction in utilized degrees of freedom in optimization steps may be used in various ways. For example, consider an instance where map-building or scanning starts at the top of a stairwell. First, a base map may be built using a SLAM device while standing still, holding a mapping device in a level pose with the rotation axis of the LIDAR generally perpendicular to the direction of descent. Once a sufficient baseline is built, the operator of the SLAM device may switch scan matching modes to a twist-reducing scan mode to change the computation of pose that decouples at least one of roll, pitch, and yaw, then moves down (or perhaps up) stairs with the mapping device held perpendicular to descent and generally pointing to the center of the stairwell throughout movement.

Since drift is largely time based, ascent or descent may occur relatively rapidly as long as motion is smooth. During descent each successive scan uses the twist-reducing pose optimization technique to process the scanned/imaged data to be stored in a point cloud. Once the user exits the stairwell the device may be changed back to its traditional mapping and pose estimation mode, such as for example, turning off the twist-reducing scan mode.

In accordance with an alternative method, twist reduction that also reduces local errors may include activating a twist reduction mode during motion in a stairwell or the like to fall back on the IMU and/or camera estimates that have fewer unpredictable twists as new sections are revealed than the LIDAR matching. Then, the operator may stop, for example, halfway to a third of the way down each flight when a next flight or turn in the flight comes into view and the laser view is more stable. At that point the user would turn full scan matching back on (i.e., turn off the twist reduction mode) to help refine position and remove blur and drift built up when the twist reduction mode was on. Implementations may alternately only retain the data collected in the sections with full scan matching on to reduce the noisy measurements during the decoupled portions of the scan. Alternatively, the data collected may be tagged based on collection state and filtered in post processing.

This approach may proceed with brief stops to add data and refine position and add data to the map at each landing and at the halfway point of each flight. This is possible due to the twist reduction mode keeping the global drift very low while on, but also not introducing a significant local error that often occurs in the frequent environmental "transitions" within a stairwell. Also, optimization confidence metrics during scan matching can be used to automate much of this process by detecting when it is okay to switch back to full scan matching mode. This may be done by examining the eigenvectors and eigenvalues of the covariance matrix to determine degrees of freedom that are of low confidence. Alternately the system in a "stairwell" or "hallway" mode could sense when the user comes to a stop and when they resume motion as a guide for when to transition modes.

Additionally, tracking key poses during the passage along the stairwell and resuming scanning at each floor can enable the data captured in the stairwell to be used as the vertical reference frame for the entire building. It may be used as an anchor for subsequent scans at each floor. Doing this in multiple stairwells in a building has the potential to create an even larger benefit.

Typically, a high-quality stationary LIDAR is capable of collecting very good scans of stairwells that are accurate, clear, and straight. However, it requires approximately four positions per floor and approximately ten minutes per position to produce such a high quality scan. In contrast, when the described pose-decoupling is employed, twenty-four floors may be scanned in approximately thirty minutes or less. The high-quality stationary LIDAR scan described above would require nearly seven hours to scan a mere ten floors. The LIDAR dictates the quality of the scan. Thus, while the high-end stationary LIDAR may be of better quality, the described pose-coupling scanning method and means is an order of magnitude faster. As LIDAR technology and algorithms continue to improve, the differences in accuracy and precision between the two methods will matter less and less.

Details

State estimation using perception sensor data extracts useful information in the sensor data to formulate a mathematical problem. The extracted information can be texture information, if using vision sensors such as a camera, or structural information, if using range sensors such as a LIDAR. Regardless of the sensors being used, the formulated problem has to be well conditioned, meaning that the sensor data contains sufficient information to constrain the solution in all directions in the state space. When insufficient information is provided in the sensor data, the problem is degraded—certain directions in the state space are unconstrained, and resulting solution is invalid in the degraded directions.

One way to solve a degraded problem is to decouple the degraded directions from the well-structured directions in the state space. The proposed roll/pitch twist reduction and yaw twist reduction do so by limiting the state estimation (in this instance device pose is the resulting feature being generated) to a lower dimensional state space. With roll/pitch twist reduction, the 2 degree of freedom (DOF) rotational motion is estimated solely by the onboard IMU, as opposed to a the full state estimation algorithm. In this roll/pitch twist reduction mode, the state estimation problem may be refined by computer vision and scan matching in the remaining 4 DOFs (x, y, z, and yaw) instead of 6 DOF, while holding the roll and pitch DOF unchanged. Likewise, with yaw twist reduction, the one DOF rotational motion is estimated by the onboard IMU as opposed to by the full state estimation algorithm. With both roll/pitch decoupling and yaw twist reduction, the state estimation is refined by computer vision and scan matching in 3 DOF (x, y, and z) only, the three rotational DOFs remain unchanged from a previous calculation. The approach is particularly helpful when insufficient texture information is contained in the image data, or insufficient structural information is contained in the range data, such that the state estimation cannot be carried out in full 6 DOF. A result, for example is that new camera and/or scan data that would otherwise cause the scan matching function to generate a twist or distortion in the scanned image, does not have as significant an impact on the scanned image.

In some exemplary embodiments, one may automatically turn on/off roll/pitch decoupling and yaw decoupling during the mapping process in response to degradation of certain pose DOF measures. To this end, one may utilize eigenvalues and eigenvectors associated with the state estimation problem to determine degraded directions in the state space. Specifically, when roll or pitch are in the degraded directions, roll/pitch decoupling is turned on, and when yaw is in the degraded directions, yaw decoupling is turned on. The potential feature will ease the mapping process and help produce results in a better quality especially for new users.

As discussed above, there are two ways to handle a degraded state estimation problem wherein a scanning device, such as a SLAM device, experiences degradation in one or more directions each correlated to a degree of freedom. One way comprises adding more sensor data to provide constraints in the degraded directions in the state space. This requires additional sensors. In contrast, as described above, another way comprises decoupling the degraded directions from well-conditioned directions. This involves roll/pitch decoupling and yaw decoupling.

Figure 4:
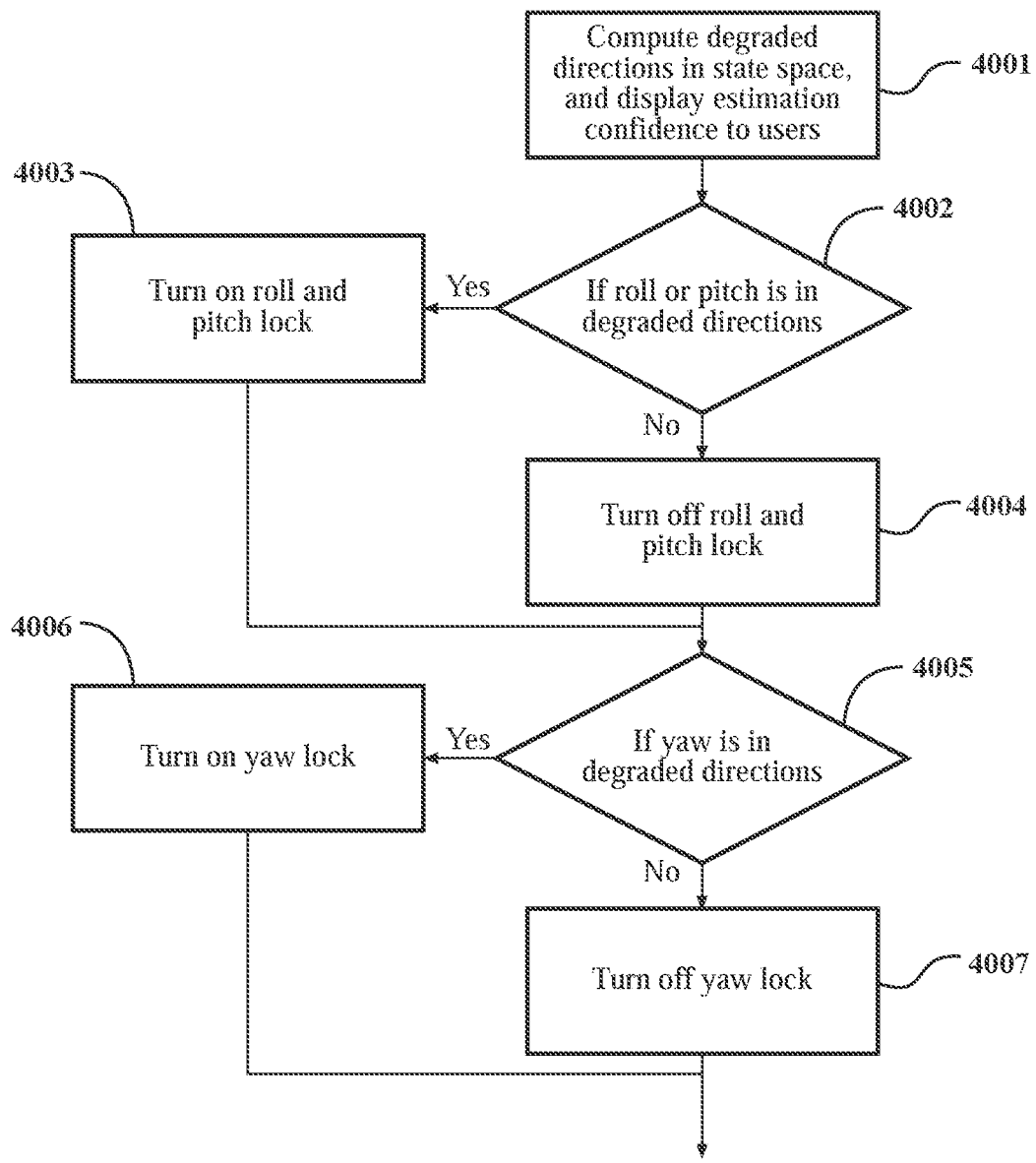
FIG. 4 is a flowchart of an exemplary an non-limiting embodiment of the flow of information and decision points related to decision points for roll and pitch decoupling and yaw decoupling.

With reference to FIG. 4, there is illustrated an exemplary and non-limiting embodiment of the flow of information and decision points related to decision points for roll and pitch decoupling and yaw decoupling. The illustrated method may be used for both manual and automated versions of this technique.

First, at step 4001, the estimated confidence of degraded directions in state space are computed. In the case of manual performance, the estimated confidences are displayed to a user, such as via a user interface of a SLAM device. These values may be normalized to provide a specific scale of good and poor values such as 1 to 100 or 0 to 50,000. Thresholds may be set such that reverting to earlier estimates occurs when the new estimates are less likely to be accurate than the prior estimates (e.g., your camera uncertainty is less than the expected average IMU error). This should be tuned to specific sensors. Next, at step 4002, a decision is made as to whether a degraded direction corresponds to either roll or pitch. If either roll or pitch is found to be in a degraded direction, processing proceeds to step 4003 whereat roll and pitch lock is turned on. If neither roll nor pitch is found to be in a degraded direction, processing proceeds to step 4004 where roll and pitch lock are turned off. The default setting of using all sensor information is on until a degraded condition is determined. Processing then proceeds to step 4005 whereat a decision is made as to whether a degraded direction corresponds to yaw. If yaw is found to be in a degraded direction, processing proceeds to step 4006 whereat yaw lock is turned on. If yaw is not found to be in a degraded direction, processing proceeds to step 4007 whereat roll and pitch lock is turned off.

Figure 5A:
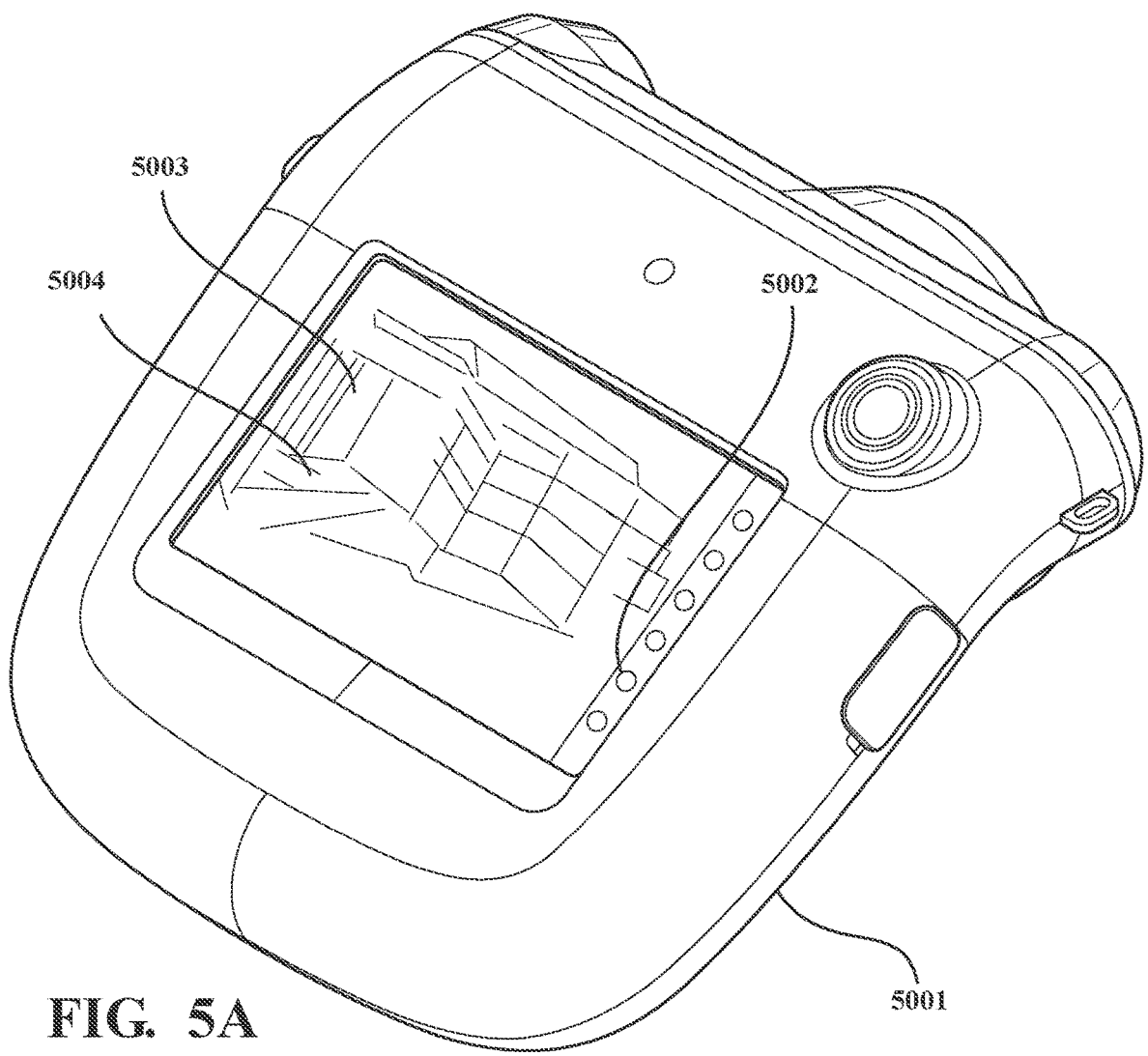
FIGS. 5($a$)-5($c$) illustrate an exemplary portable handheld real-time mapping system and accompanying pose decoupling indicators.

With reference to FIG. 5, there is illustrated an exemplary portable handheld real-time mapping system 5001. Icons 5002 indicate and provide for selective control of pose decoupling features for scanning challenging environments. Operator selection may be based on visual map information, confidence measures, and knowledge of mapped environments.

The interactive screen 5003 may be used to provide selection controls for pose decoupling and for showing the real time map 5004. Additional confidence measures, either graphical or numerical, may be used to indicate the quality of the map being built at that time. Typically, if the confidence measure is low, the mapping process can be slowed down, or mapping can be rewound and repeated for that section. In addition, pose-decoupling can be used to gather a better quality map at that point.

Figure 5B:
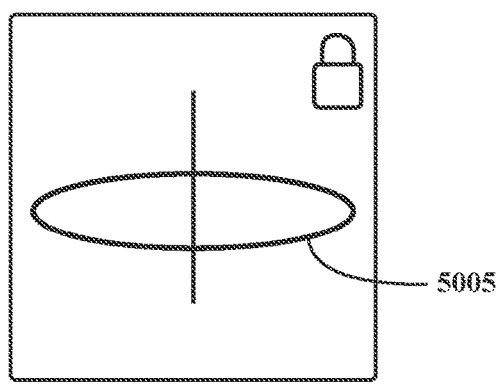
Figure 5C:
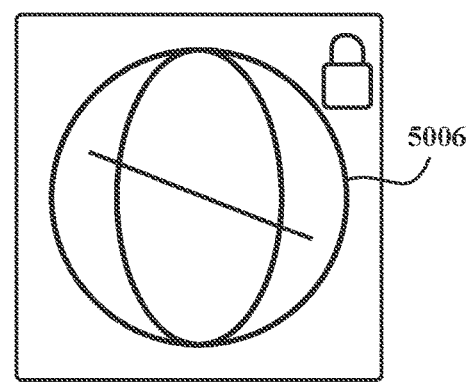

With reference to FIGS. 5(b) and 5(c), there are illustrated exemplary versions of icons 5005, 5006 for selectively turning on and off pose-decoupling functions for Yaw (icon 5005) and Roll & Pitch (icon 5006).

As noted, icon 5005 represents a Yaw-decoupling function and enables such function upon activation or selection. Upon selection of icon 5005 decoupling of the yaw function is realized. Similarly, when icon 5006 is selected, the roll and pitch axes are effectively decoupled. When selected, a portion of each icon may disappear or any one of several graphical means may be employed to indicate selection of the icon 5005, 5006. In the instance that each icon 5005, 5006 appears on a button, the icon may be lit or not lit. A physical button or switch may be toggled and an LED may provide an indication of a decoupling status in one or more devices where specific modes are selected and deselected. The function may also be implemented in an interactive screen through the use of gestures, stylus, track pad, trackball, joystick, and interactive displays including, but not limited to, capacitive touch, resistive touch, and so forth.

Figure 6:
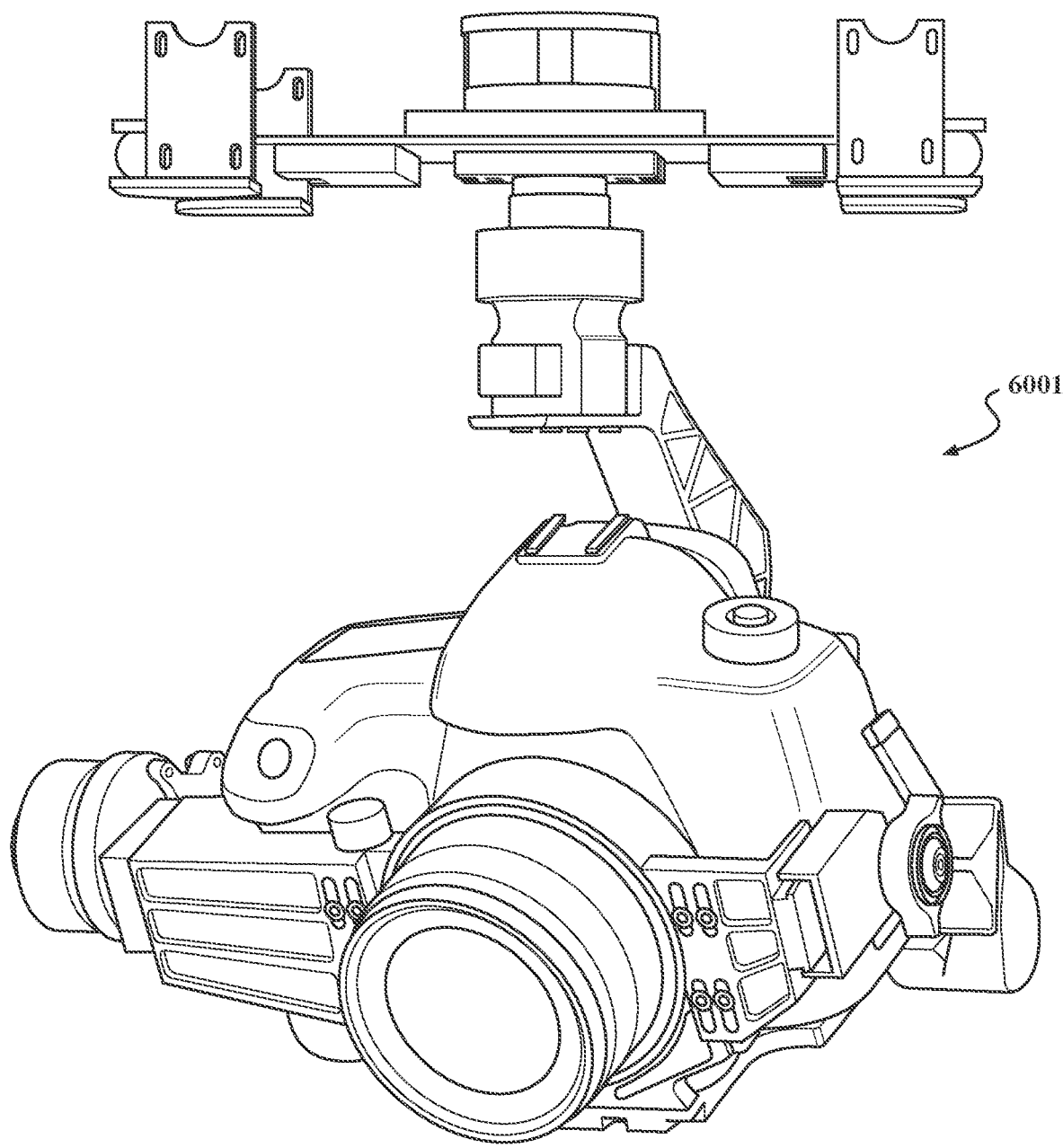
FIG. 6 is an illustration of an exemplary and non-limiting embodiment of a stabilizing platform.

When the system is physically out of reach of an operator or if automatic control is desired, a stabilizing platform can be used to provide a stable pose-decoupling capability. With reference to FIG. 6, there is illustrated an exemplary and non-limiting embodiment of stabilizing platform 6001. The mapping system may be mounted directly to a stabilizing platform that provides fixed orientation or control of the mapping system. The use of a stabilizing platform for a mapping and localization system may provide external control of pose to ensure good quality pose capture. The stabilizing platform may be used to control the orientation of the unit and not just stabilize the unit. This form of active control may be interfaced to the analysis of the mapped environment geometry. That is, the pose estimation of the system may be used to adjust the stabilizing platform to maintain the same roll, pitch, and/or yaw during motion. While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having sender-controlled contact media content item multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes.

The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media has sender-controlled contact media content item a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices has sender-controlled contact media content item artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "haa sender-controlled contact media content item," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A method of pose calculation for a portable three-dimensional scanning device comprising a first sensor and a second sensor the method comprising:
    utilizing first data from the first sensor and first data from the second sensor to acquire data defining first values of six degrees of freedom of the scanning device to determine a first pose;
    receiving second data from the first sensor to acquire data defining second values for the six degrees of freedom of the scanning device;
    selecting a subset of the six degrees of freedom of the scanning device, wherein selecting the subset comprises selecting the subset based, at least in part, upon a confidence measurement of at least one value of the first values of the six degrees of freedom of the scanning device;
    utilizing the second data from the first sensor to acquire data defining the second values for the selected subset of the six degrees of freedom of the scanning device to determine a second pose, wherein values for the unselected degrees of freedom for the scanning device for the second pose are retained from the first pose; and
    storing received data associated with the second pose in a point cloud database.

2. The method of claim 1 wherein the portable three-dimensional scanning device comprises a simultaneous localization and mapping (SLAM) device.

3. The method of claim 1 wherein the confidence measurement is derived, at least in part, by an eigenvector and an associated eigenvalue of a covariance matrix.

4. The method of claim 1 further comprising:
    displaying the confidence measurement on a user interface portion of the scanning device; and
    receiving from a user of the scanning device the selection of the subset of the six degrees of freedom of the scanning device.

5. The method of claim 1 wherein the selection of the subset is performed automatically.

6. The method of claim 1 wherein, if the confidence measurement is above a predetermined threshold, the selected subset of the six degrees of freedom of the scanning device comprises all six degrees of freedom of the scanning device.

7. The method of claim 1 wherein selecting the subset further comprises selecting the subset so as to exclude one of or both of yaw and roll/pitch of the scanning device.

8. The method of claim 1, wherein the first sensor comprises one of an inertial measurement unit (IMU), a tracking camera or a LIDAR and wherein the second sensor is of a different type to the first sensor, and comprises one of an IMU, tracking camera or LIDAR.

9. The method of claim 8, wherein the first sensor includes an inertial measurement unit (IMU) and data from the first sensor comprises IMU data.

10. The method of claim 8, wherein the second sensor is a tracking camera and the data from the second sensor comprises camera data.

11. The method of claim 8, wherein the scanning device comprises a third sensor that comprises one of the IMU, the tracking camera or the LIDAR and is of a different type than the first sensor and the second sensor.

* * * * *

UNITED STATES PATENT AND TRADEMARK OFFICE
CERTIFICATE OF CORRECTION

PATENT NO. : 11,573,325 B2
APPLICATION NO. : 16/733787
DATED : February 7, 2023
INVENTOR(S) : Huber et al.

It is certified that error appears in the above-identified patent and that said Letters Patent is hereby corrected as shown below:

On the Title Page

On page 3, in Column 1, Item (56) under "Other Publications", Line 3, delete "17763885 5," and insert --17763885.5,-- therefor On page 3, in Column 1, Item (56) under "Other Publications", Line 11, delete "RegisliaLion" and insert --Registration-- therefor On page 3, in Column 2, Item (56) under "Other Publications", Lines 39-40, delete "PCT/US2019/022384,Invitation" and insert --PCT/US2019/022384, Invitation-- therefor In the Specification In Column 1, Line 37, delete "WO 2017/0155970," and insert --WO 2017/155970.-- therefor In Column 1, Line 39, delete "WO 2018/017146" and insert --WO 2018/071416-- therefor In Column 3, Line 64, delete "eignvectors)." and insert --eigenvectors).-- therefor In Column 12, Line 60, delete ""haa" and insert --"has-- therefor Signed and Sealed this
Twelfth Day of September, 2023

*Katherine Kelly Vidal*
Katherine Kelly Vidal
*Director of the United States Patent and Trademark Office*